Nov. 16, 1965 P. HUIJER ETAL 3,218,616

MAGNETORESISTIVE READOUT OF THIN-FILM MEMORIES

Filed July 13, 1962

INVENTOR
PIETER HUIJER
HUGO F. PIT
BY
Frank R. Trifari
AGENT

United States Patent Office 3,218,616

Patented Nov. 16, 1965

3,218,616

MAGNETORESISTIVE READOUT OF THIN-FILM MEMORIES

Pieter Huijer and Hugo Frans Pit, Emmasingel, Eindhoven, Netherlands, assignors to North American Philips Company, Inc., New York, N.Y., a corporation of Delaware Filed July 13, 1962, Ser. No. 209,553

Claims priority, application Netherlands, July 20, 1961, 267,332

5 Claims. (Cl. 340—174)

This invention relates to a magnetic memory device comprising memory elements composed of conductive magnetic material having a rectangular hysteresis loop and shaped in the form of a thin film having a preferred direction of magnetization in the plane of the film. The memory elements are arranged in the rows and columns of a matrix, the memory elements of any one row being inductively coupled to the same conductor; the magnetic field associated with a current traversing such a conductor acts upon the memory elements coupled thereto in a direction making an angle with the preferred direction of magnetization. Means are provided for supplying a read-out pulse to a conductor to enable the magnetization condition of a memory element coupled to the conductor to be read out.

It is a primary object of the present invention to provide a magnetic memory device of this type which permits the variation in magnetization of any memory element to be detected with the aid of an indicating device common to all the memory elements.

In accordance with one aspect of the invention, means are provided which permit a substantially constant current to be temporarily and selectively supplied to the series combination of the memory elements of any one column, a device for indicating a variation of the said current being coupled to all the series combinations of memory elements.

It is a further object of the invention to reduce transient voltages set up at the indicating device by the above-mentioned current supply means. This is achieved in accordance with the invention by passing the current to be supplied to the memory elements of a column through a balance hybrid system, the indicating device being coupled to a terminal of the hybrid system which is electrically decoupled from the current supply terminal.

Figure 1:
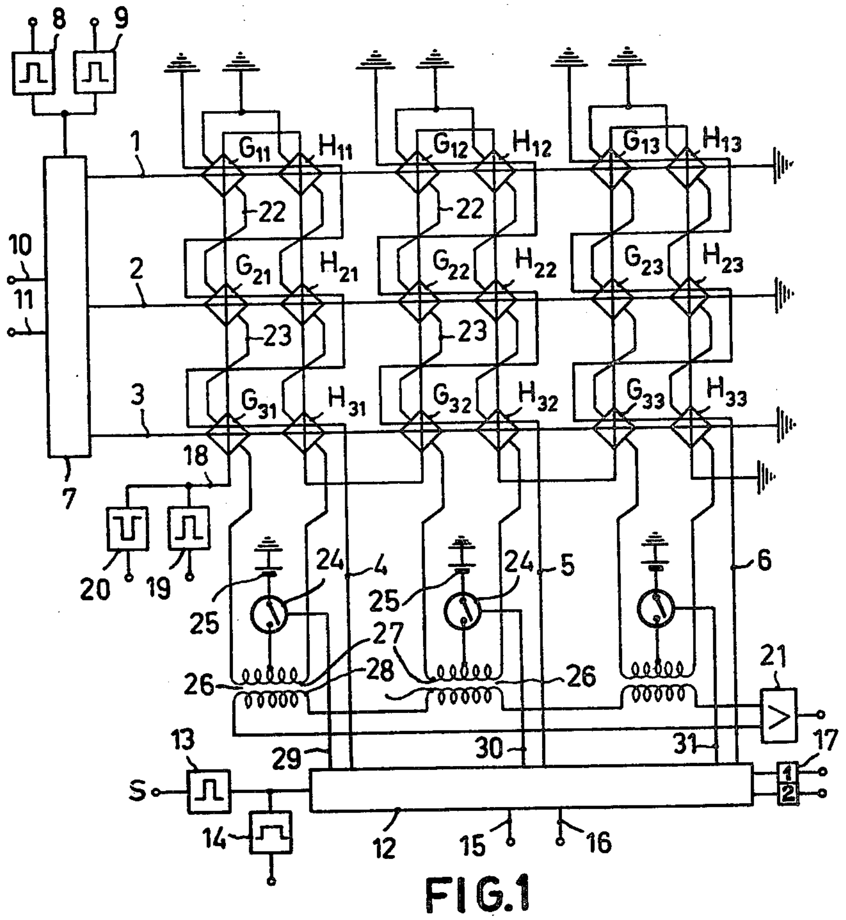
Figure 2:
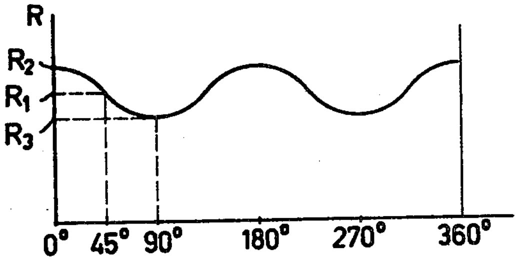

In order that the invention may readily be carried into effect, an embodiment thereof will now be described in detail, by way of example, with reference to the accompanying diagrammatic drawings, in which:

FIGURE 1 is a schematic circuit diagram of a preferred embodiment of a magnetic memory device in accordance with the invention, and FIGURE 2 shows any one of the resistance characteristic curves of memory elements shown in FIGURE 1.

The memory device shown in FIGURE 1 comprises memory elements G11–G33 arranged into the rows and columns of a matrix. The memory elements of any one row G11–G13, G21–G23 and G31–G33 respectively are coupled to the same row conductor 1, 2 and 3 respectively. The memory elements of any one column G11–G31, G12–G32 and G13–G33 respectively are coupled to the same column conductor 4, 5 and 6 respectively. The row conductors are connected to the outputs of a selecting circuit 7 adapted to connect pulse sources 8 and 9 connected to its input to one of its outputs in accordance with the information appearing at control terminals 10 and 11. The selecting circuit 7 may comprise in a manner known in the art a group of gate circuits, the outputs being connected to the row conductors and the inputs being connected to the sources 8 and 9; the control terminals are being connected to the control inputs 10 and 11 either directly (in which case the control inputs) 10 and 11 are representative of a group of control inputs or via a translator. The pulse sources 8 and 9 are adapted to deliver a pulse upon reception of a control pulse. The pulse source 8 is used when supplying information. The pulse source 9 is used when reading out information. The column conductors are connected to outputs of a selecting circuit 12 adapted to connect pulse sources 13 and 14 connected to its input, in accordance with the information appearing at control terminals 15 and 16, to one of the column conductors in condition 1 of a bistable trigger circuit 17, and to one of a group of control conductors 29 to 31 in the condition 2 of the trigger circuit 1.

The selecting circuit 12 may comprise in a manner known in the art two groups of gate circuits, the outputs of the first group being connected to the column conductors, the outputs of the second group being connected to the control conductors and the inputs of both groups being connected to the pulse sources 13 and 14; the selecting circuit 12 may include electronic switch-over contacts actuated by the trigger circuit 17 to switch over the control inputs 15 and 16 from the control inputs of the first group to the second group or vice versa, either directly or through a translator. The pulse sources 13 and 14 are adapted to deliver a pulse on reception of a control pulse. The pulse source 13 is used when supplying information to the memory device, the trigger circuit 17 then in the condition 1. The pulse source 14 is used when reading out information from the memory device, the trigger circuit 17 then being in the condition 2.

All the memory elements G11–G33 are coupled to a common information conductor 18 connected to information pulse sources 19 and 20. The pulse source 19 is used when supplying the information "1." The pulse source 20 is used when supplying the information "0." The pulse sources 19 and 20 are adapted to deliver a pulse on reception of a control pulse. The polarity of a pulse delivered by the source 19 is opposite to that of a pulse delivered by the source 20.

The memory elements G11–G33 are made of a magnetic material having a rectangular hysteresis loop and shaped in the form of a thin film, and they have a preferred direction of magnetization in the plane of the film. The memory elements are shown in plan view. The thickness of a memory element in a direction at right angles to the plane of the drawing is so small that each memory element comprises a domain of magnetization of one direction. During the process of applying the memory elements to a base, for example a heated sheet of glass by deposition from vapour, a magnetic field is applied; this results in preferred magnetization in the direction of the applied magnetic field. In the preferred direction the magnetization may be in either of two stable conditions which are positive and negative. The information "1" is stored in a memory element by setting the magnetization to a predetermined stable condition. The information "0" is stored by setting the magnetization to the other stable condition. In the drawing the preferred direction of magnetization extends parallel to the row conductors. The direction from left to right in the drawing is considered as the direction of positive magnetization corresponding to the information "1."

It has been found that the variation in the magnetization of a memory element under the control of a magnetic field in a direction at an angle to the preferred direction of the magnetization is effected by rotation of the vector of magnetization to the direction of the applied field. Ultimately the vector of magnetization occupies a position between the preferred direction of the magnetization and the direction of the magnetic field, equilibrium being established between the external field and the internal anisotropic field.

Supplying a given item of information, for example the information "1," to an arbitrary memory element, for example the element G12, is effected as follows. The information corresponding to the row conductor and column conductor to be selected is supplied to the selecting circuits 7 and 12 respectively and the trigger circuit 17 is set to the condition 1. Control pulses are then applied to the pulse sources 8 and 13 which consequently cause pulses to pass through the row conductor 1 and the column conductor 5 respectively. These pulses produce magnetic fields which act in support of each other in the memory element G12 in a direction at right angles to the preferred direction of magnetization. It should be noted that in a practical embodiment of the memory device under consideration the row and column conductors are tape-shaped and have the same transverse dimensions as the memory elements so that the magnetic field produced by the conductors in the memory elements is substantially uniform. The strength of the common field is such that the magnetization is rotated through an angle of about 80° to the direction of the field. A control pulse is also applied to the pulse source 19 which as a result causes a pulse corresponding to the information "1" to pass through the information conductor 18. This conductor is coupled to the memory elements in a manner such that the magnetic field produced in the memory elements by the pulse is parallel to the preferred direction of magnetization and for the information "1" is directed from left to right. The strength of the field is sufficient to bring the already rotated magnetization vector of the memory element G12, irrespective of the information initially stored by the said memory element, to a position making an angle of less than 90° with the direction from left to right. On termination of the pulses through the row and column conductors the magnetization vector rotates to the stable condition in which the magnetization is directed from left to right. The memory element G12 is now in the condition 1.

The combined magnetic field produced by the row conductor 1 and the combined information conductor 18 cannot change the information of the memory elements G11–G13. Similarly, the magnetic field produced by the column conductor 5 and the information conductor 18 cannot change the information of the memory elements G22 and G32. The vectors of magnetization of the said elements return to their initial directions on termination of the pulses.

To permit information to be read out from any memory element by means of a common read-out amplifier (designated as reference numeral 21) the memory elements of each column are conductively connected in series with one another through conductors 22 and 23; they are also connected, in series with a switch 24, between the terminals of a supply source 25. The series combinations of the memory elements are coupled to the input of the read-out amplifier 21 through transformers 26.

The switches 24, which are shown diagrammatically by a switch contact but are preferably pulse-controlled electronic switches, may be closed under the control of a pulse applied through a corresponding control lead 29, 30 or 31 respectively.

Reading out the information from an arbitrary memory element, for example the element G12, is effected as follows. The information corresponding to the row conductor and column conductor to be selected is supplied to the selecting circuits 7 and 12 respectively, the trigger circuit 17 now being set to condition 2. A control pulse is then applied to the pulse source 14 which thereby transmits a pulse through a control conductor 30 as a result of which the switch 24 is maintained closed for the duration of the pulse. In the closed condition of the switch 24 the supply source 25 causes a direct current to flow through the series combination of the memory elements G12–G32. This current traverses the memory elements in a direction making an angle of substantially 45° with the preferred direction of magnetization. When the current has reached a steady value, a control pulse is applied to the pulse source 9 which then delivers a pulse through the row conductor 1. The magnetic field produced in the memory elements G11–G13 by the pulse has a direction at right angles to the preferred direction of magnetization. The strength of the field is such that the magnetization vector rotates through an angle of substantially 45° in the direction of the applied field. Thus the direction of the magnetization vector is either parallel to or at right angles to the direction of the current according to whether the memory element stores the information "1" or the information "0."

In reading out the information condition the magnetoresistance effect is utilized. It has been found that the resistance of a memory element to an electric current depends upon the angle between the vector of magnetization and the direction of the current. The resistance is a maximum when the magnetization vector and the current have the same direction, and is a minimum when the magnetization vector is at right angles to the direction of the current. In FIGURE 2 the resistance R of a memory element is plotted against the angle between the magnetization vector and the current direction. As mentioned above this angle is equal to 45° in the absence of an external magnetic field so that the resistance is equal to R1. If the memory element stores the information "1," the angle during read-out becomes equal to 0° and the resistance increases to the value R2. If the memory element stores the information "0" the angle becomes equal to 90° and the resistance decreases to the value R3.

Under the control of the magnetic field produced in the memory element G12 by the pulse applied to the row conductor 1 the resistance of this element is increased and the current traversing it is decreased if the information "1" is read out whereas the resistance is decreased and the current is increased if the information "0" is read. The current variations are transmitted through the transformer 26 to the input of the read-out amplifier 21. On termination of the pulse from the source 9 the vectors of magnetization of the memory element G11–G13 return to their initial conditions. At the end of the pulse from the pulse source 14 the switch 24 is opened.

To prevent a pulse from being produced at the input of the read-out amplifier 21 when the direct current is switched, the direct-current circuit and the input of the read-out amplifier are decoupled by means of hybrid systems. The primary winding 27 of transformer 26 is provided with a center tap which forms part of such a hybrid system. The load of the supply source 25 is constituted by the series combination of memory elements connected between one end of the winding 27 and ground. To achieve a current distribution at the center tap over the two parts of the winding 27 such that no voltage is produced across the winding 27, the other end of the winding 27 may be connected to ground through an impedance identical with the impedance of the series combination of the memory elements. To obtain this identity under all conditions this impedance comprises an additional series combination of memory elements. Thus memory elements H11–H31, H12–H32 and H13–H33 are provided and are respectively associated with the columns.

The secondary windings 28 of the transformers 26 are connected in series to the input of the read-out amplifier 21. When a direct current is switched no voltage is produced across the secondary windings so that the amplifier is not cut off and is always ready to amplify any signal read out.

For constructional reasons and also to increase the symmetry of the structure of the memory device it is desirable for each of the memory elements H11–H33 to be coupled to the same row conductor as the corresponding one of the memory elements G11–G33.

When a switch 24 is closed the current supplied by the source 25 divides into equal parts traversing the winding 27 in opposite directions. Since a memory element G— is read out simultaneously with the corresponding element H—, the variations of the direct current passing through these elements must always be opposite for a voltage to be produced across the winding 27. Hence a memory element H— is always brought to a condition of magnetization different from that of the corresponding element G—. In the embodiment shown this is achieved by coupling the memory elements H11–H33 to the column conductors in the same sense as the memory elements G11–G33, while coupling the memory elements H11–H33 to the information conductor 18 in a sense opposite to that of the memory elements G11–G33. If the information "1" is supplied to a memory element such as element G11 by simultaneously supplying a pulse from source 8 to the row conductor 1 and a pulse from source 13 to column conductor 4 and by supplying a pulse from source 19 to the information conductor 18 then the pulses passing through the conductors 1 and 4 act upon the memory element G11 in the same manner as upon element H11 whereas the pulse passing through information conductor 18 acts upon the elements G11 and H11 in an opposite manner. That is to say if the information "1" is written in the element G11 then the information "0" is written in element H11 and conversely. This applies as well for every other pair of memory elements G— and H—.

The above described memory device is two-dimensional. A three-dimensional memory is obtained by combining a number of the memory devices described. For this purpose corresponding direct-current circuits and also corresponding row conductors and column conductors may be connected either in parallel or in series. In this combination the selecting circuits and the associated pulse sources and switches are used in common. The information pulse sources, the information conductor and the reading amplifier remain individual for each memory device. Supplying and reading out information is effected in a manner similar to that described hereinbefore with respect to an individual memory device with the understanding that the magnetization conditions of corresponding memory elements of the individual memory devices are simultaneously read out in parallel.

Many other modifications and variations will be apparent to those skilled in the art without departing from the inventive concept, the scope of which is set forth in the appended claims.

What is claimed is:

1. A memory system comprising a plurality of memory elements consisting of conductive magnetic material having a substantially rectangular hysteresis curve, each of said elements being in the form of a thin film with a preferential orientation of the magnetization in the plane of the film, said elements being arranged in the form of a matrix having a plurality of rows and columns, a plurality of horizontal conductor means each being inductively coupled to a particular row, a plurality of vertical conductor means each being inductively coupled to a particular column, means for supplying pulses of a predetermined magnitude to selected ones of said horizontal and vertical conductors for supplying information to a selected element, a plurality of electrically conductive means each being conductively connected to at least one of said elements, each conductive means conductively interconnecting in series successive elements of a single row or column, means for temporarily supplying a substantially constant current to the successive elements of a selected row or column through said conductive means and means for applying a read-out pulse of a predetermined magnitude to a selected one of said conductors during the time that said constant current is supplied for reading out information in a selected element, and detecting means for detecting the change of said current due to the application of said read-out pulse, said detecting means being coupled to all of the conductively interconnected elements.

2. A memory system as recited in claim 1, further including a plurality of other similar matrices, wherein the means for supplying a constant current and the means for applying a read-out pulse are common to the individual matrices.

3. A memory system comprising a first plurality of memory elements consisting of conductive magnetic material having a substantially rectangular hysteresis curve, each of said elements being in the form of a thin film with a preferential orientation of the magnetization in the plane of the film, said elements being arranged in the form of a matrix having a plurality of rows and columns, a plurality of horizontal conductor means each being inductively coupled to a particular row, a plurality of vertical conductor means each being inductively coupled to a particular column, means for supplying pulses of a predetermined magnitude to selected ones of said horizontal and vertical conductors for supplying information to a selected element, a plurality of electrically conductive means each being conductively connected to at least one of said elements, each conductive means conductively interconnecting in series successive elements of a single row or column, a second plurality of similar elements forming a balanced hybrid system with said first plurality, a current supply terminal for temporarily supplying a substantially constant current to the successive elements of a selected row or column of said balanced hybrid system through said conductive means and means for applying a read-out pulse of a predetermined magnitude to a selected one of said conductors during the time that said constant current is supplied for reading out information in a selected element, and detecting means for detecting the change of said current due to the application of said read-out pulse, said detecting means being coupled to all of the conductively interconnected elements at terminals of the hybrid system which are decoupled from the current supply terminal.

4. A memory system comprising a first plurality of elements consisting of conductive magnetic material having a substantially rectangular hysteresis curve, each of said elements being in the form of a thin film with a preferential orientation of the magnetization in the plane of the film, said elements being arranged in the form of a matrix having a plurality of rows and columns, a plurality of horizontal conductor means each being inductively coupled to a particular row, a plurality of vertical conductor means each being inductively coupled to a particular column, means for supplying pulses of a predetermined magnitude to selected ones of said horizontal and vertical conductors for supplying information to a selected element, a plurality of electrically conductive means each being conductively connected to at least one of said elements, each conductive means conductively interconnecting in series successive elements of a single row or column, a second plurality of similar elements forming a balanced hybrid system with said first plurality, each memory element of the second plurality being inductively coupled to the same row conductor as a corresponding memory element of the same column, a particular magnetization condition being set up in one memory element when the opposite magnetization condition is set upon in the corresponding memory element, a current supply terminal for temporarily supplying a substantially constant current to the successive elements of a selected row or column of said balanced hybrid system through said conductive means and means for applying a read-out pulse of a predetermined magnitude to a selected one of said conductors during the the time that said constant current is supplied for reading out information in a selected element, and detecting means for detecting the change of said current due to the application of said read-out pulse, said detecting means being coupled to all of the conductively interconnected elements at terminals of the hybrid system which are decoupled from the current supply terminal.

5. A memory system as recited in claim 4, further including a plurality of other similar matrices, wherein the current supply terminal and the means for applying a read-out pulse are common to the individual matrices.

References Cited by the Examiner

UNITED STATES PATENTS

| | | | |
|---|---|---|---|
| 3,070,783 | 12/1962 | Pohm | 340—174 |
| 3,076,958 | 2/1963 | Pohm | 340—174 |
| 3,093,818 | 6/1963 | Hunter | 340—174 |

IRVING L. SRAGOW, *Primary Examiner.*